United States Patent [19]
Lipsker

[11] Patent Number: 6,153,034
[45] Date of Patent: Nov. 28, 2000

[54] RAPID PROTOTYPING

[75] Inventor: Daniel Lipsker, Atlit, Israel

[73] Assignee: Micromod R.P. LTD, Granot, Israel

[21] Appl. No.: 09/128,100

[22] Filed: Aug. 3, 1998

[30] Foreign Application Priority Data

Aug. 3, 1997 [IL] Israel ......................................... 121458

[51] Int. Cl.⁷ ..................................................... B32B 31/16
[52] U.S. Cl. .......................... 156/73.1; 156/167; 156/510; 156/580.1
[58] Field of Search .................................. 156/73.1, 73.2, 156/250, 256, 510, 580.1, 580.2, 166, 167

[56] References Cited

U.S. PATENT DOCUMENTS

| | | |
|---|---|---|
| 3,046,178 | 7/1962 | Tupper ..................... 156/167 |
| 3,248,444 | 4/1966 | Nixon . |
| 3,262,808 | 7/1966 | Crooks et al. . |
| 3,368,989 | 2/1968 | Wissinger et al. . |
| 3,410,310 | 11/1968 | Ray . |
| 3,411,686 | 11/1968 | Bender . |
| 3,507,660 | 4/1970 | Nishio et al. . |
| 3,633,113 | 1/1972 | Grubel et al. . |
| 4,961,154 | 10/1990 | Pomerantz et al. . |
| 5,031,120 | 7/1991 | Pomerantz et al. . |
| 5,139,338 | 8/1992 | Pomerantz et al. . |
| 5,157,423 | 10/1992 | Zur . |
| 5,177,689 | 1/1993 | Kinasi et al. . |
| 5,263,130 | 11/1993 | Pomerantz et al. . |
| 5,287,435 | 2/1994 | Cohen et al. . |
| 5,289,214 | 2/1994 | Zur . |
| 5,307,499 | 4/1994 | Yin . |
| 5,386,500 | 1/1995 | Pomerantz et al. . |
| 5,398,193 | 3/1995 | de Angelis . |
| 5,426,722 | 6/1995 | Batchelder . |
| 5,433,280 | 7/1995 | Smith . |
| 5,448,687 | 9/1995 | Hoogerhyde et al. . |
| 5,453,933 | 9/1995 | Wright et al. . |
| 5,453,934 | 9/1995 | Taghavi et al. . |
| 5,458,825 | 10/1995 | Grolman et al. . |
| 5,459,868 | 10/1995 | Fong . |
| 5,491,643 | 2/1996 | Batchelder . |
| 5,515,903 | 5/1996 | Hronas et al. . |
| 5,542,070 | 7/1996 | LeBlanc et al. . |
| 5,544,550 | 8/1996 | Smith . |
| 5,545,367 | 8/1996 | Bae et al. . |
| 5,578,227 | 11/1996 | Rabinovich . |

OTHER PUBLICATIONS

M.K. Raymond,"Unraveling Rapid Prototype Methods", *American Machinist*, pp. 24–31, Jun. 1996.
*NSF Workshop on Design Methodologies for Solid Freeform Fabrication*, Jun. 1995.
Brochure:"Rapid Tooling Tops Bill at RP Conference", *Machine Design*, p. 44, Apr. 20, 1995.
Brochure:"CAD/CAM Planning Guide", p. 9A, 1996.
Brochure:"Faster Rapid Prototype is Designed for the Desktop", *Machine Design*, p. 26, Dec. 14, 1995.
Brochure:"Rapid Ptototyping Produces Metal Parts", *Machine Design*, p. 22, Jan. 26, 1995.
Brochure:"Prototyping Machine Builds Models with Ink–Jet Methods", *Machine Design*, p. 52, May 11, 1995.
Brochure:"Neuractor, Computer Numerically Controlled Desktop Manufacturing System", *U.S. Cyberlab, Inc.*
Brochure:"Rapid Growth for Rapid Prototyping".

*Primary Examiner*—James Sells
*Attorney, Agent, or Firm*—Darby & Darby

[57] ABSTRACT

Rapid prototype apparatus including an adhesive dispenser for dispensing an adhesive and an actuator which moves the adhesive dispenser in at least one of six degrees of freedom (preferably in at least four degrees of freedom, and most preferably in six degrees of freedom) in accordance with a geometry of an object. The adhesive dispenser then dispenses the adhesive in accordance with the geometry of the object, applying successive layers of adhesive one on top of the previous layer. The adhesive layers cure and bond to each other, thus forming a prototype of the object.

11 Claims, 4 Drawing Sheets

RAPID PROTOTYPING

FIELD OF THE INVENTION

The present invention relates generally to apparatus and methods for rapid prototyping, and particularly to rapid prototype deposition modeling techniques and apparatus.

BACKGROUND OF THE INVENTION

Rapid prototyping systems are well known. The following U.S. Pat. Nos. are believed to be representative of the state of the art: 5,545,367, 5,544,550, 5,542,070, 5,515,903, 5,491,643, 5,459,868, 5,458,825, 5,453,934, 5,448,687, 5,433,280, 5,426,722, 5,398,193, 5,386,500, 5,307,499, 5,289,214, 5,287,435, 5,263,130, 5,177,689, 5,157,423, 5,139,338, 5,031,120, 4,961,154, 3,633,113, 3,507,660, 3,411,686, 3,410,310, 3,368,989, 3,262,808, and 3,248,444.

Rapid prototyping methods of the art include stereolithography, solid ground curing, selective laser sintering, fused deposition modeling and droplet deposition, which are all discussed briefly in "Unraveling rapid prototype methods", M. K. Raymond, *American Machinist*, June 1996, pages 24–31.

Fused deposition modeling (FDM) is an extrusion method for thermoplastic material, developed and commercialized by Stratasys Inc., Eden Prairie, MN. In FDM, a continuous filament of a thermoplastic polymer or wax is passed through a heated nozzle. The material is delivered as a wire into an extrusion head and heated so that it is extruded at a temperature slightly above the flow point. The material solidifies rapidly after deposition, each layer being fused to the previous layer. A drawback of FDM is that external supports are generally needed to support the deposited layers. The external supports must be removed after completing the model.

U.S. Pat. No. 5,578,227 to Rabinovich describes a model making method including delivering thin, continuous feedstock of materials which have various profiles with opposite flat sides and fusing the feedstock by adhesion or welding of a flat side with an energy source to a flat side of a previous layer, while keeping the feedstock cross-section in substantially original shape. The "adhesion" of the Rabinovich method is not adhesive but rather a term used alternatively to "welding" to describe the joining of one layer to a previous layer. Rabinovich is limited to laser welding one flat side of a layer to another flat side of a previous layer, and the method cannot be used for any cross-sectional shape. Additionally, the method is limited to weldable materials.

SUMMARY OF THE INVENTION

The present invention seeks to provide improved rapid prototype deposition modeling techniques and apparatus, wherein a building material is added layer by layer to build an accurate replica of a given object, without having to remove building material to arrive at the finished prototype. No heating of deposited material is required and no external supports are generally needed to support the deposited layers. The invention is applicable to a much wider variety of materials and slender building elements than the prior art.

There is thus provided in accordance with a preferred embodiment of the present invention, rapid prototype apparatus including an adhesive dispenser for dispensing an adhesive and an actuator which moves the adhesive dispenser in at least four degrees of freedom in accordance with a geometry of an object. The adhesive dispenser then dispenses the adhesive in accordance with the geometry of the object, applying successive layers of adhesive one on top of the previous layer. The adhesive layers cure and bond to each other, thus forming a prototype of the object.

In accordance with a preferred embodiment of the present invention, a wire dispenser is also provided for dispensing a wire, wherein the actuator moves the wire dispenser in at least four degrees of freedom in accordance with the geometry of the object, and the adhesive dispenser applies adhesive to the wire so as to bond a previously dispensed portion of wire to a presently dispensed portion of wire. Preferably the adhesive dispenser and the wire dispenser are juxtaposed with each other and the adhesive dispenser dispenses the adhesive as the wire is dispensed by the wire dispenser. Alternatively, the adhesive dispenser may be located so as to dispense the adhesive into the wire dispenser such that the wire is dispensed from the wire dispenser pre-coated with the adhesive.

It is noted that throughout the specification and the claims the term "wire" encompasses any slender, dispensable building element, such as, but not limited to, wire, rod, bar, string, rope, thread, yarn, cord, filament, fiber, twine, strand, chain, cable, or wire twist.

The wire may be constructed from one or materials, such as, but not limited to, metals, plastics, especially thermoplastics, natural (vegetable and animal) and synthetic fibers, composite materials, putty, elastomers, and adhesives. Even extrudable food products, such as dough, may be used.

The adhesive is preferably a quick curing adhesive, such as, but not limited to, cyanoacrylates or ultraviolet curable adhesives. However, the invention can be carried out with other adhesives such as epoxies, animal glues and vegetable glues.

Additionally in accordance with a preferred embodiment of the present invention, a cutter is provided for cutting the wire after being dispensed by the wire dispenser. The cutter is particularly useful in forming discrete or non-continuous portions of the object.

There is also provided in accordance with a preferred embodiment of the present invention, a method for producing a rapid prototype including dispensing layers of an adhesive in at least four degrees of freedom in accordance with a geometry of an object, and curing the layers to form a prototype of the object.

In accordance with a preferred embodiment of the present invention, a previously dispensed portion of adhesive is bonded to a presently dispensed portion of adhesive. Preferably a successive layer of adhesive is dispensed one on top of a previous layer.

There is also provided in accordance with a preferred embodiment of the present invention, a method for producing a rapid prototype including dispensing layers of a wire in at least four degrees of freedom in accordance with a geometry of an object, applying adhesive to the wire so as to bond a previously dispensed portion of wire to a presently dispensed portion of wire, and curing the adhesive so that the layers of the wire form a prototype of the object. Preferably the adhesive at least partially covers a perimeter of the wire.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
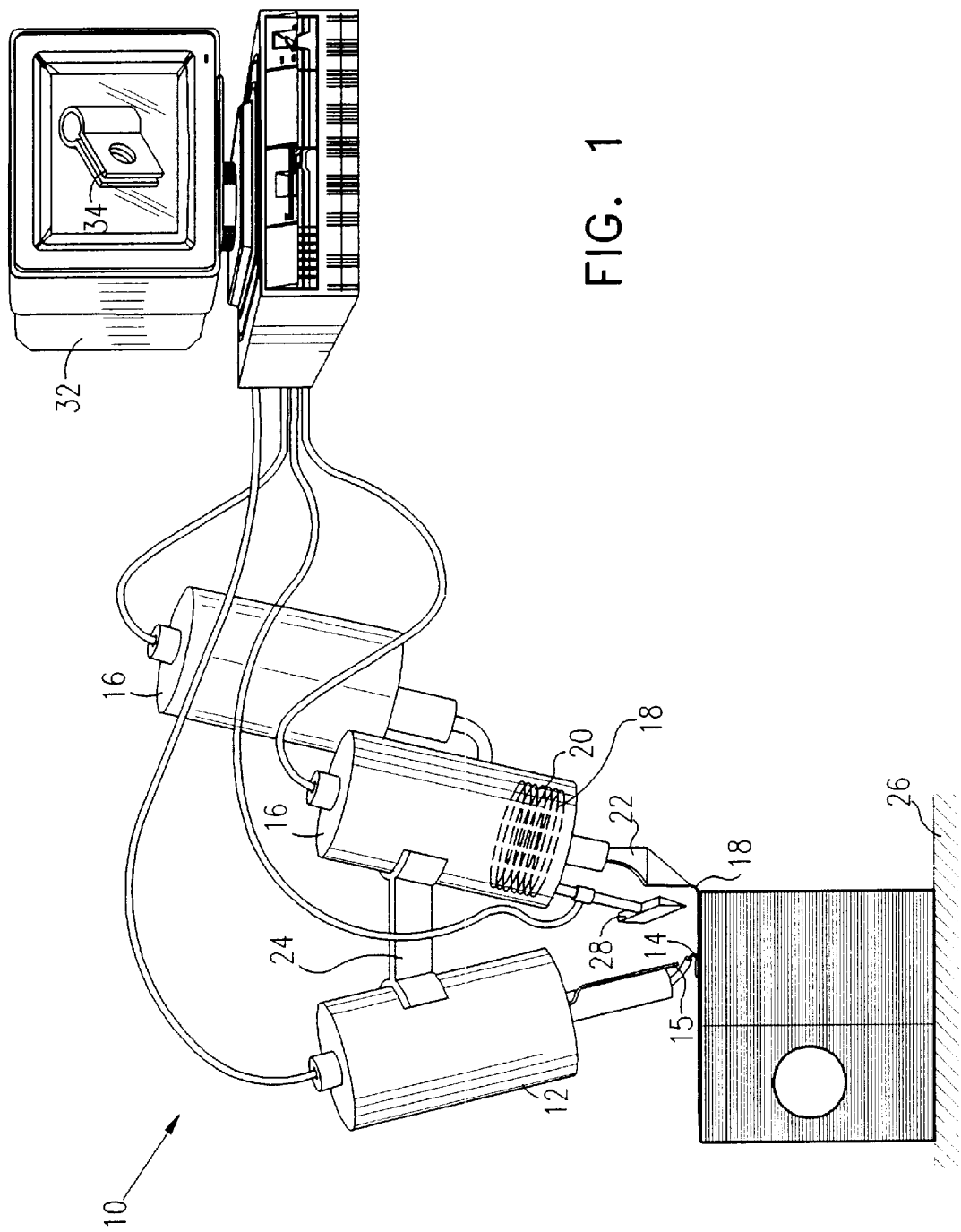
FIG. 1 is a simplified pictorial illustration of rapid prototype apparatus, constructed and operative in accordance with a preferred embodiment of the present invention.

Reference is now made to FIG. 1 which illustrates rapid prototype apparatus 10, constructed and operative in accordance with a preferred embodiment of the present invention.

Rapid prototype apparatus 10 preferably includes an adhesive dispenser 12 for dispensing an adhesive 14. Adhesive dispenser 14 is may be any conventional adhesive dispenser and is preferably an electrically operated and controlled dispenser widely used in the packaging industry. Adhesive 14 is preferably a quick curing adhesive, such as, but not limited to, cyanoacrylates or ultraviolet curable adhesives. The present invention can also be carried out with other adhesives such as thermocurable adhesives, epoxies, animal glues, vegetable glues, lacquers, polymers, monomers, self-adhesive materials, double-sided adhesives, single side adhesives, and so-called "hot" glues.

In the case of thermocurable adhesives, heat is applied, preferably in a controlled manner, to cure the adhesive. In the case of ultraviolet curable adhesives, an optic fiber 15 may be used to transmit ultraviolet energy to the adhesive for curing purposes. As is known in the art, the ultraviolet energy is transmitted at a frequency and power level selected for the particular adhesive.

A wire dispenser 16 is preferably provided for dispensing a wire 18. Wire dispenser preferably has a storage receptacle 20 for storing therein wire 18 which may be dispensed through a nozzle 22. Preferably adhesive dispenser 12 and wire dispenser 16 are juxtaposed with each other and adhesive dispenser 12 dispenses adhesive 14 as wire 18 is dispensed by wire dispenser 16. The flow of adhesive 14 on wire 18 will be described more in detail hereinbelow. Adhesive dispenser 12 and wire dispenser 16 may be fixedly attached to each other, such as by means of a bracket 24. Wire 18 is typically dispensed on a bed 26.

Figure 4A:
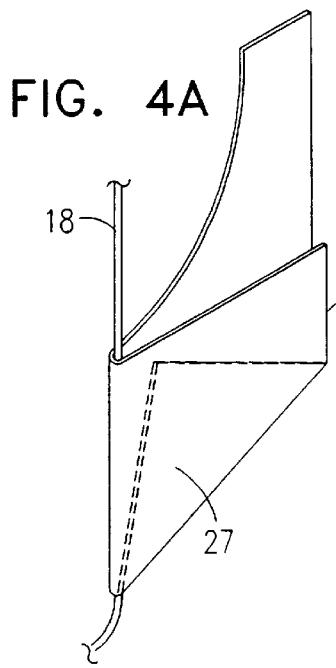
FIGS. 4A, 4B, 4C and 4D are simplified pictorial illustrations of wire dispensers, constructed and operative in accordance with different preferred embodiments of the present invention.

The type of wire dispenser 16 used depends on the form of wire 18. Preferably apparatus 10 includes a set of interchangeable wire dispensers 16 and/or nozzles 22 to suit a particular wire 18 and selected material. For example, for slender, soft wires, such as string or thread, wire dispenser 16 may comprise a bobbin for holding the wire 18 and wire 18 may simply be spooled off from the bobbin, such as through wheels and guides to prevent snagging, in a manner similar to that of a sewing machine. Referring to FIG. 4A, it is seen that nozzle 22 may comprise a folded conical nozzle 27 which ensures that a soft wire 18 is accurately fed from a tip of nozzle 27, regardless of the position of the rest of wire 18 upstream from the tip of nozzle 27. For harder, yet malleable materials, such as copper wire, wire dispenser 16 may comprise feeding equipment for feeding a generally continuous wire which is dispensed through nozzle 22. In such a case, the wire is generally annealed before dispensing thereof, or may even be preheated.

Figure 4B:
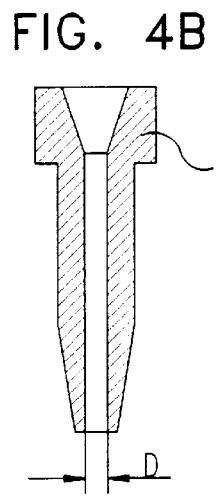

Reference is now made to FIG. 4B which illustrates a wire dispenser 17, constructed and operative in accordance with another preferred embodiment of the present invention. Wire dispenser 17 as illustrated is a capillary type of dispenser commercially available from such companies as Micro-Swiss Ltd., P.O. Box 90, Yokneam Elite, Israel, that is used in the semiconductor interconnect industry. Such a dispenser is particularly useful to dispense very thin wires such as gold wires used to interconnect integrated circuits and I/O leads in microelectronics. Such wires may be bonded to each other by ultrasonic welding at frequencies of 50–70 KHz, for example. Wire dispenser 17 has an inner diameter D that is slightly larger than the diameter of the wire being dispensed. The example of wire dispenser 17 emphasizes the applicability of the present invention to even very small diameter wires such as 0.001 mm.

Figure 4C:
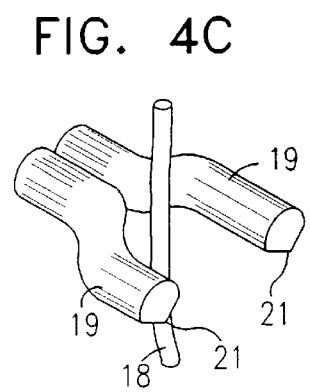
Figure 4D:
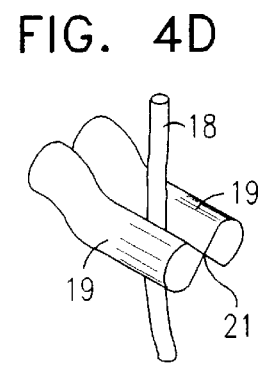

Reference is now made to FIG. 4C and FIG. 4D which illustrates a wire dispenser 19, constructed and operative in accordance with yet another preferred embodiment of the present invention. Wire dispenser 19 is a holding instrument, such as tweezers, tongs or pliers, for example. In this embodiment, a wire cutter 21 may be provided together with the dispenser 19, for cutting wire 18.

No matter what form wire dispenser 16 and wire 18 are provided, wire 18 is preferably dispensed from wire dispenser 16 such that only a required amount of wire 18 protrudes from and is fed by nozzle 22 and the rest of wire 18 remains on its spool or bobbin or other storage apparatus.

Wire 18 may be constructed from one or materials, such as, but not limited to, metals, plastics, especially thermoplastics, natural (vegetable and animal) and synthetic fibers, composite materials, putty, elastomers, glass and adhesives. Even extrudable food products, such as dough, may be used. Wire 18 generally has a round cross section, although any other arbitrary cross section such as rectangular or triangular is of course possible. The accuracy of the finished prototype depends largely on the thickness of wire 18. Wires with a diameter of 0.001 mm may be used to achieve especially high accuracy.

In accordance with a preferred embodiment of the present invention, a cutter 28 is provided for cutting wire 18 after being dispensed by wire dispenser 16. Cutter 28 is particularly useful in forming discrete or non-continuous portions of an object. Cutter 28 is illustrated as an electrically operated and controlled knife, but it is appreciated that cutter 28 may comprise other cutting instruments, such as a laser or water jet. Cutter 28 is illustrated disposed intermediate adhesive dispenser 12 and wire dispenser 16, however, it is appreciated that cutter 28 may be placed in any other suitable location.

Apparatus 10 includes an actuator 30 which moves adhesive dispenser 12 and wire dispenser 16 in at least one of six degrees of freedom (preferably in at least four degrees of freedom, and most preferably in six degrees of freedom). For simplifying the description of the embodiment, FIG. 1 illustrates a greatly simplified version of actuator 30, however, a more detailed illustration of a preferred embodiment of an actuator is given with reference to FIG. 6.

Actuator 30 preferably communicates with a computer 32 which contains a data base containing the three-dimensional geometry of an object 34. As is well known in the art of rapid prototyping, readily available software may be used to communicate the geometry of object 34 to actuator 30 in accordance with a variety of protocols and coordinate systems, such as Cartesian, polar or cylindrical. Optionally, customized software may be developed in accordance with a particular need.

Preferably a user can interact with the software and input data, such as wire thickness, type of material, and type of adhesive. Using stored data of physical and mechanical properties of adhesives and wire materials, and using well known principles of mechanical engineering, the software can calculate and control movement of actuator 30 in accordance with the chosen adhesive and material.

Actuator 30 thus may be used to move adhesive dispenser 12 and wire dispenser 16 in accordance with the geometry of object 34. Computer 32 may be in wired or wireless communication with adhesive dispenser 12, wire dispenser 16, cutter 28 and actuator 30.

Figure 2:
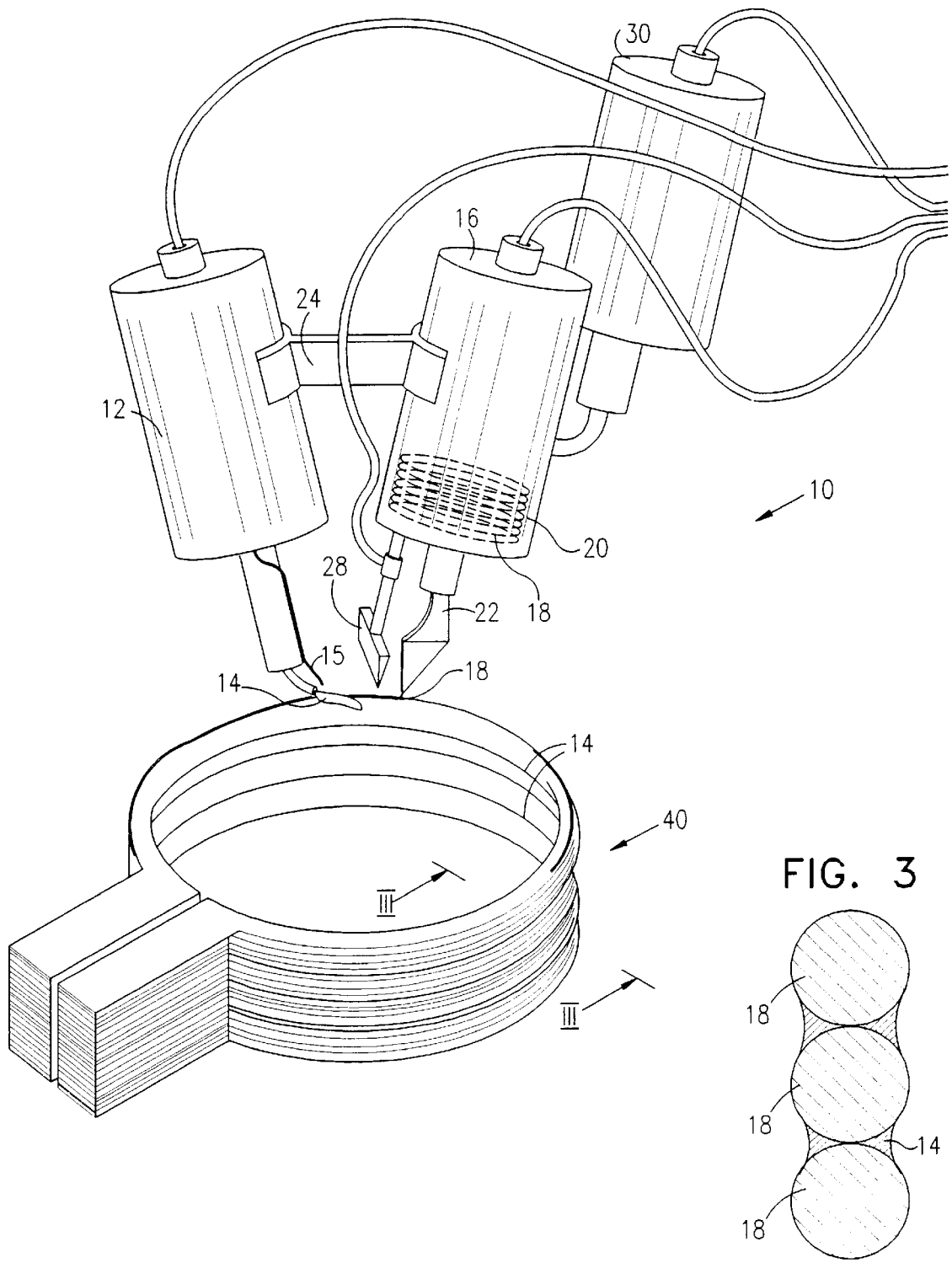
FIG. 2 is a simplified pictorial illustration of the rapid prototype apparatus of FIG. 1 forming a prototype of a three-dimensional object.

Reference is now made to FIG. 2 which illustrates rapid prototype apparatus 10 forming a prototype of three-dimensional object 34 (FIG. 1). Actuator 30 preferably dispenses layers of wire 18 in accordance with the geometry of object 34, and adhesive dispenser 12 applies adhesive 14 to wire 18 so as to bond a previously dispensed portion of wire 18 to a presently dispensed portion of wire 18. A successive layer of wire 18 may be dispensed one on top of a previous layer. Adhesive 14 then cures so that the layers of wire 18 form a prototype 40 of object 34.

If necessary, wires of different materials may be dispensed to form a multi-material prototype. Moreover, a portion of the prototype may be formed with a discardible wire, i.e., a wire which serves as a support for other wires and which is purposely removed later to form the finished prototype. For example, a portion of the prototype may be formed with wax wires which serve as a support for structural wires, such as metal wires. The wax wires are later removed by melting, thereby leaving a metal wire prototype.

Figure 3:
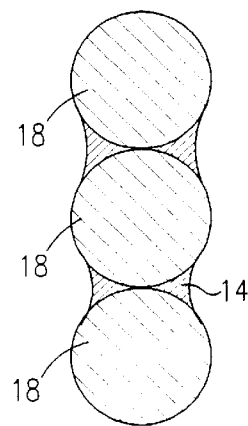
FIG. 3 is a simplified sectional illustration of a portion of a prototype formed with the apparatus of FIG. 1, taken along lines III—III in FIG. 2.

Reference is now made to FIG. 3 which illustrates a portion of prototype 40 formed with wire 18 and adhesive 14. It is seen that preferably adhesive 14 at least partially covers a perimeter of wire 18. Adhesive dispenser 12 may control application of adhesive 14 to control the degree of covering of wire 18 and, to some extent, the finished appearance of the surface of prototype 40. Adhesive 14 generally wicks by capillary action between successive layers of wire 18. Adhesive 18 may be applied to bond wire 18 to bed 26, if desired, in order to fix the first layer of wire 18 in place.

Figure 5:
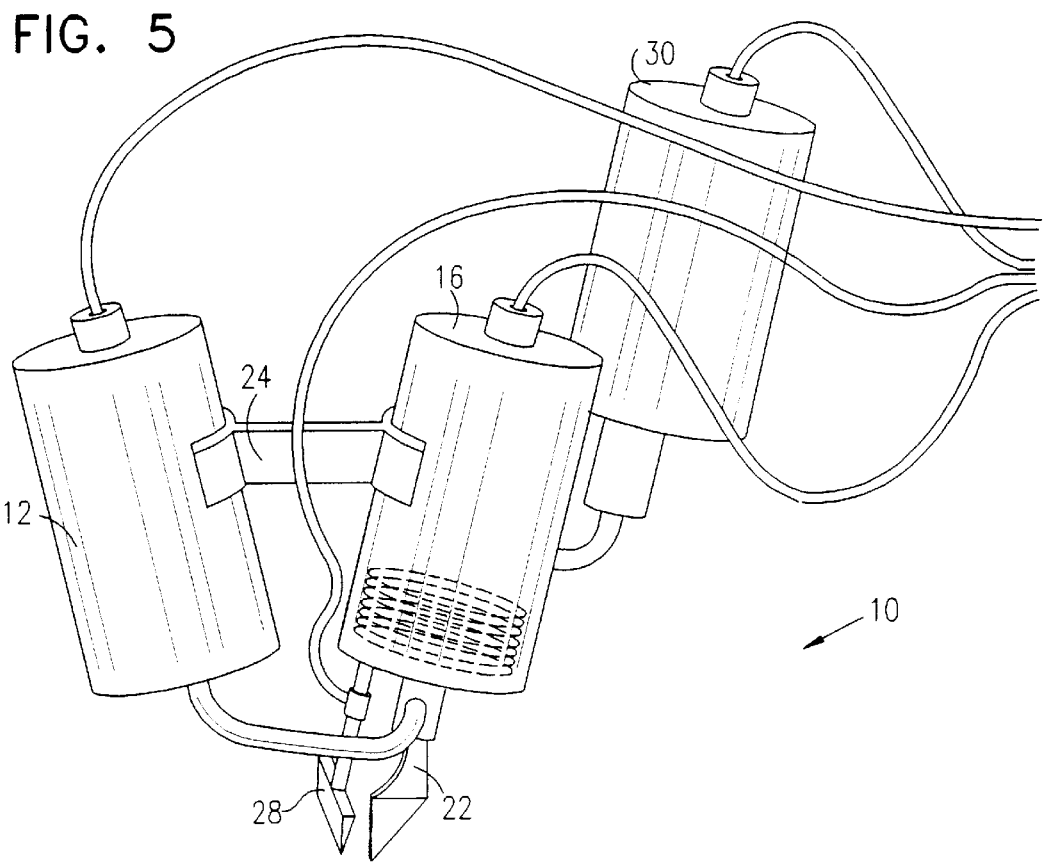
FIG. 5 is a simplified pictorial illustration of an alternative method of applying adhesive to a wire in accordance with a preferred embodiment of the present invention.

Reference is now made to FIG. 5 which illustrates an alternative method of applying adhesive 14 to wire 18, in accordance with a preferred embodiment of the present invention. Adhesive dispenser 12 may be located so as to dispense adhesive 14 into nozzle 22 such that wire 18 is dispensed from wire dispenser 16 pre-coated with adhesive 14. Indeed application of the wires and adhesive may be synchronized in any desired manner.

In accordance with another preferred embodiment of the present invention, prototype 40 may be produced by only dispensing layers of adhesive 14 in at least one of six degrees of freedom, (preferably in at least four degrees of freedom, and most preferably in six degrees of freedom) in accordance with the geometry of object 34, and thereafter curing the layers of adhesive 14. Preferably a previously dispensed portion of adhesive 14 is bonded to a presently dispensed portion of adhesive 14. A successive layer of adhesive 14 may be dispensed one on top of a previous layer. In this embodiment, engineering and design parameters, such as size of an adhesive bead being dispensed, viscosity and density of adhesive, bonding and curing characteristics of the adhesive, should be carefully chosen in order that each subsequent layer of adhesive bonds and cures properly with previous layers.

Figure 6:
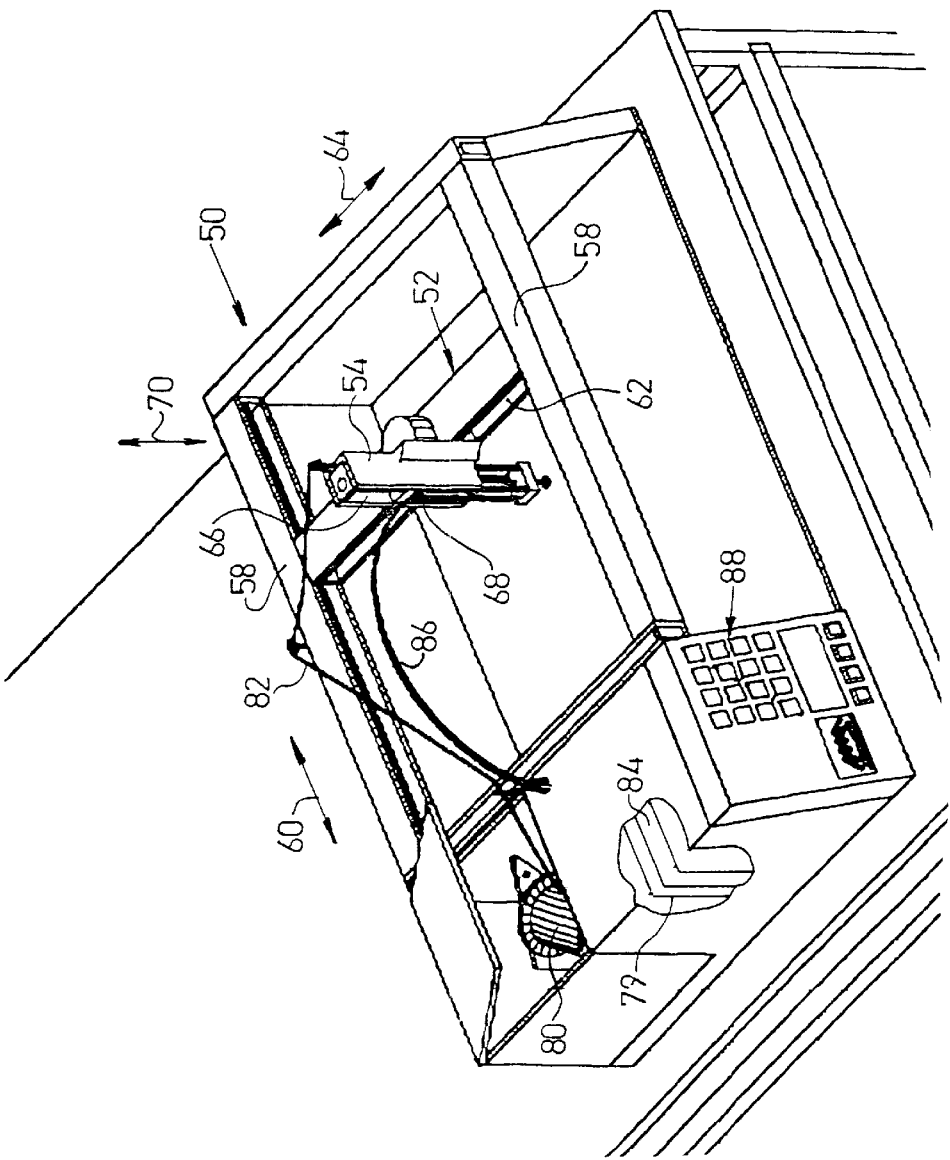
FIG. 6 is a simplified pictorial illustration of an actuator capable of moving an adhesive dispenser and a wire dispenser in at least four degrees of freedom in accordance with a geometry of an object, constructed and operative in accordance with a preferred embodiment of the present invention.

Reference is now made to FIG. 6 which illustrates an actuator 50, constructed and operative in accordance with a preferred embodiment of the present invention.

Actuator 50 preferably includes a three-dimensional motion system 52, such as the NEURACTOR CNC® computer numerically controlled desktop manufacturing system, commercially available form U.S. Cyberlab, Inc., 14786 Slate Gap Rd., West Fork, Ark. It is appreciated that other three-dimensional motion systems or computer numerically controlled systems may be used to carry out the invention as well. Such a system is readily controlled by computer 32 as described hereinabove.

System 52 preferably includes a motion head 54 mounted on a guide element 56. Opposite ends of guide element 56 are preferably disposed for sliding motion in a pair of rails 58 generally along an axis 60. Motion head 54 is preferably disposed for sliding motion in a track 62 of guide element 56 generally along an axis 64, generally perpendicular to axis 60. Motion head 54 preferably includes a track 66 in which a block 68 is disposed for sliding motion generally along an axis 70, generally orthogonal to axes 60 and 64. Axes 60, 64 and 70 thus form a Cartesian coordinate system. Motion control circuitry 79 controls motion of motion head 54.

A wire dispenser 80 dispenses a wire 82 to motion head. As described hereinabove for adhesive dispenser 12, an adhesive dispenser (not shown) may be fixedly attached to motion head 54. Thus, actuator 50 is capable of moving an adhesive dispenser and a wire dispenser in at least one of six degrees of freedom in accordance with a geometry of an object. A UV lamp 84 may be provided which transmits UV light via an optic fiber 86 to the vicinity of motion head 54 to cure the layers of adhesive. A control panel 88 with control buttons may be provided for convenient operation of the system.

In summary, the present invention provides an improved technique for building any size prototype, wherein a building material is added layer by layer to build an accurate replica of a given object, without having to remove building material to arrive at the finished prototype. The prototype may afterwards be coated or finished by any suitable coating or finishing technique, such as painting or electrochemical finishing, for example.

The present invention may be conveniently used to scan an object for inputting three-dimensional data of the object into a computer program. The nozzle 22 of wire dispenser 16 may be replaced with a scanning tip which is passed over the object, as is known in the art.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

What is claimed is:

1. A method for producing a prototype of an object, comprising:

dispensing layers of a wire in at least four degrees of freedom in accordance with a geometry of the object; and bonding a previously dispensed portion of the wire to a presently dispensed portion of the wire with adhesive, said adhesive being formed of a material which is different and distinct from said wire.

2. A method according to claim 1 and comprising curing the adhesive so that the layers of the wire form a prototype of the object.

3. A method according to claim 2 wherein the adhesive at least partially covers a perimeter of the wire.

4. A method according to claim 1 wherein the adhesive is selected from the group consisting of: quick curing adhesives, cyanoacrylates, ultraviolet curable adhesives, thermocurable adhesives, epoxies, animal glues, vegetable glues, lacquers, polymers, monomers, self-adhesive materials, double-sided adhesives, single side adhesives, and hot glues.

5. A method according to claim 1 wherein said bonding further comprises ultrasonic welding.

6. A method according to claim 1 wherein the wire is selected from the group consisting of: metals, plastics, thermoplastics, vegetable fibers, animal fibers, synthetic fibers, composite materials, putty, elastomers, adhesives and extrudable food products.

7. Apparatus for producing a prototype of an object, comprising:

a wire dispenser for dispensing a wire;

an adhesive dispenser for dispensing an adhesive, which is formed of a material which is different and distinct from said wire; and an actuator which moves the wire dispenser and the adhesive dispenser in at least four degrees of freedom in accordance with a geometry of said object.

8. Apparatus according to claim 7 wherein the adhesive dispenser and the wire dispenser are fixedly attached to each other.

9. Apparatus according to claim 7 wherein the adhesive dispenser dispenses the adhesive as the wire is dispensed by the wire dispenser.

10. Apparatus according to claim 7 wherein the adhesive dispenser dispenses the adhesive into the wire dispenser such that the wire is dispensed from the wire dispenser pre-coated with the adhesive.

11. Apparatus according to claim 7 and comprising a cutter for cutting the wire after being dispensed by the wire dispenser.

* * * * *